UNITED STATES PATENT OFFICE.

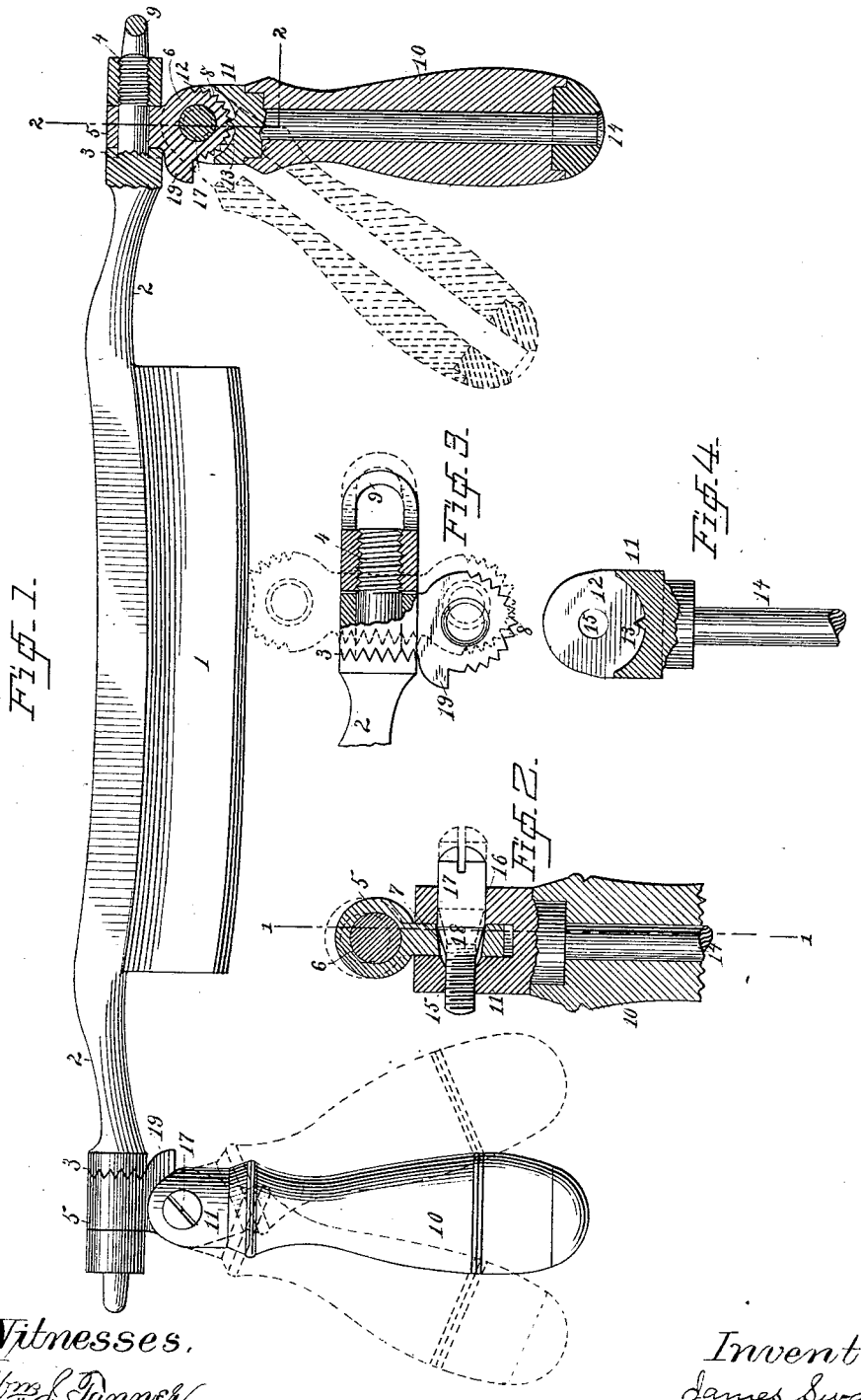

JAMES SWAN, OF SEYMOUR, CONNECTICUT.

DRAW-SHAVE.

SPECIFICATION forming part of Letters Patent No. 386,903, dated July 31, 1888.

Application filed February 20, 1888. Serial No. 264,617. (No model.)

*To all whom it may concern:*

Be it known that I, JAMES SWAN, a citizen of the United States, residing at Seymour, in the county of New Haven and State of Connecticut, have invented certain new and useful Improvements in Draw-Shaves; and I do hereby declare the following to be a full, clear, and exact description of the invention, such as will enable others skilled in the art to which it appertains to make and use the same.

My invention has for its object to provide handles for this class of tools which may readily be swung in and out relatively to the cutting-edge, and may also be adjusted at any angle relatively to the plane of the cutting-edge, the essential requirements being that the device shall be durable, the adjustments positive and quickly effected, and that the first cost shall be reduced to the minimum.

With these ends in view I have devised the novel construction which I will now describe, referring by numbers to the accompanying drawings, forming part of this specification, in which—

Figure 1 is an elevation of a draw-shave complete, various positions of the handle being shown in dotted lines, and the right handle in section on the line 1 1 in Fig. 2; Fig. 2, a section, on an enlarged scale, on the line 2 2 in Fig. 1; Fig. 3, a detail view, partly in section, illustrating the adjustment of one of the eyes to which the handle is secured; and Fig. 4 is a detail view, partly in section, of the head of the handle, illustrating, in connection with Figs. 2 and 3, the adjustments of the handle in and out—that is, toward or from the cutting-edge.

1 denotes the blade, and 2 the shanks, each of which is provided with a set of ratchet-teeth, 3, facing outward, and is screw-threaded at its outer end, as at 4.

5 denotes collars which turn freely on the shanks, and are provided with ratchet-teeth adapted to engage teeth 3 upon the shanks.

6 denotes eyes made integral with or rigidly secured to collars 5, each of which is provided with an opening, 7, which is inclined inward from the outer side, and with teeth 8 upon the lower portion of its outer periphery.

9 denotes thumb-nuts which engage the threaded ends of shanks 2, thereby locking collars 5 positively in any position to which they may have been adjusted.

10 denotes the handles, which are provided with solid metallic heads 11, having slots 12 cut through them to receive eyes 6. The bottoms of these slots are curved inward to give ample room to the eyes, and at the center of the bottom of each slot is a solid lug or teat, 13, projecting upward, which is adapted to engage teeth 8 on the outer periphery of the eye. The handles may of course be made in any suitable manner. I preferably, however, provide a rod, 14, integral with each head, which passes through the handle and is headed at the base of the handle, as is clearly shown.

15 denotes a threaded opening in one side of each head, and 16 a larger opening, not threaded, in the opposite side of each head. The inner sides of openings 15 are ordinarily countersunk slightly, for a purpose presently to be explained.

17 denotes screw-pins, the outer ends of which fit closely in openings 16, the central portions of which are provided with inclines 18 to engage inclined openings 7 in the eyes, and the inner ends of which are screw-threaded to engage threaded openings 15 in the opposite sides of the heads.

The adjustments are effected as follows: Suppose that it is desired to change the adjustment of the handles relatively to the plane of the blade; thumb-nuts 9 are loosened, which permits collars 5 to be moved backward, so that the respective teeth on the collars and shanks do not engage. The handles are simply turned to the desired position and locked there by turning up the thumb-nuts again. Should it be desired to swing the handles in or out— that is, toward or from the cutting-edge— screw-pins 17 are loosened, which permits eye 6 to move outward, disengaging teeth 8 from lug 13. Having secured the desired adjustment of the handles, screw-pins 17 are turned inward again. Inclines 18 now come in contact with the lower sides of beveled openings 7 in the eyes, which draws the eyes inward in slot 12, causing lug 13 to engage between two of the teeth 8 on the outer periphery of the eyes. It will be noticed that the inner ends of the inclines 18 pass into the countersunk portions of threaded openings 15 when the eyes are drawn up. I am thus enabled to get an absolutely positive adjustment of the handles relatively to the cutting-edge. This is a very important feature, as it is frequently necessary in use to place the handles at this adjustment, and should the handles slip in use serious accidents might result therefrom.

19 is a stop upon the inner edge of each eye where it joins the collar, for the purpose of limiting the inward movement of the handles, so that it will be impossible under any circumstances for the hand to come in contact with the blade.

Having thus described my invention, I claim—

1. In a draw-shave, the combination, with eye 6, having an inwardly-inclined opening and teeth upon its outer periphery, of a handle having at its upper end a slot adapted to receive the eye, a lug, 13, at the base of said slot, and a screw-pin in the handle, which passes through the eye and is provided with an incline which engages the inclined opening in the eye, forcing the latter inward when the pin is turned in, so that lug 13 engages the teeth upon the eye, thereby locking the handle at any desired adjustment toward or from the cutting-edge.

2. Eye 6, having inwardly-inclined opening 7 and teeth 8 upon its outer periphery, in combination with a handle, the head of which is provided with a slot to receive the eye, said slot having a lug, 13, at its base, and a screw-pin having an incline, 18, which engages the opening in the eye, drawing the latter inward relatively to the handle, whereby the lug and teeth are caused to engage to lock the handle at any desired position.

3. Eye 6, having an inwardly-inclined opening and teeth upon its outer periphery, and a handle having a head provided with a slot through it to receive the eye, a lug, 13, at the base of said slot, an opening, 16, on one side of the head, and a threaded opening, 15, on the other side, in combination with a screw-pin, the respective ends of which engage openings 15 and 16, and which is provided with an incline, 18, adapted to engage the inclined opening in the eye, as and for the purpose set forth.

4. A draw-shave having a shank provided with ratchet-teeth 3, a collar on said shank, having ratchet-teeth engaging teeth 3, and a thumb-nut engaging the shank to lock the collar in any desired position, in combination with an eye, 6, made integral with or secured to the collar and provided with an inwardly-inclined opening, 7, and ratchet-teeth 8, a handle having a slot to receive the eye, and a lug, 13, and a screw-pin in the handle having an incline engaging the opening in the eye, substantially as described.

5. A draw-shave having shanks provided with ratchet-teeth 3 and threaded at their outer ends, and collars on said shanks, having teeth engaging teeth 3, in combination with eyes made integral with or secured to said collars, handles adjustably secured to said eyes, and thumb-nuts engaging the shanks, whereby the collars may be locked at any desired position.

In testimony whereof I affix my signature in presence of two witnesses.

JAMES SWAN.

Witnesses:
  GEO. S. WHEELER,
  GEO. H. CREE.